March 17, 1964    R. Q. KING    3,124,937
PRESSURE CONTROL IN STORAGE TANKS
Filed Nov. 7, 1961
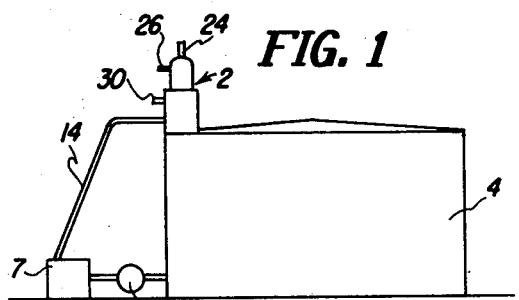
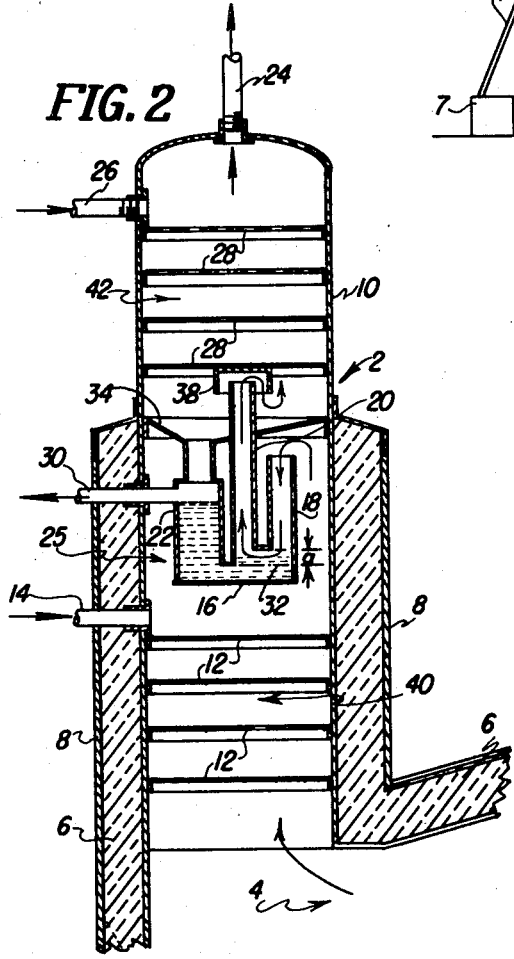
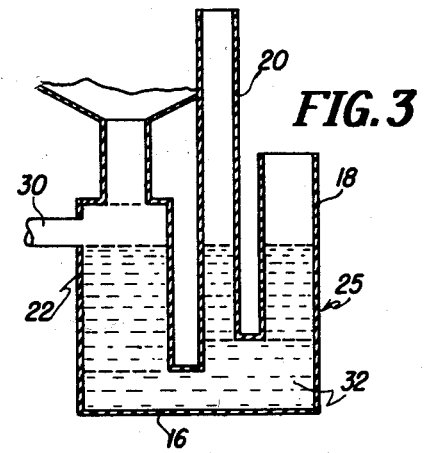
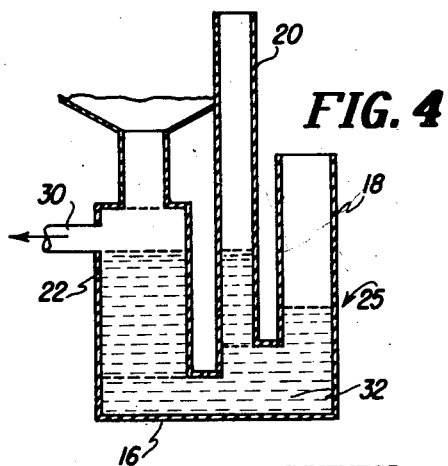
INVENTOR.
Robert Q. King
BY
Byron, Hume, Groen & Clement
Attys.

United States Patent Office 3,124,937
Patented Mar. 17, 1964

3,124,937
PRESSURE CONTROL IN STORAGE TANKS
Robert Q. King, Escondido, Calif., assignor to Union Tank Car Company, Chicago, Ill., a corporation of New Jersey
Filed Nov. 7, 1961, Ser. No. 150,789
12 Claims. (Cl. 62—54)

The present invention relates to storage tanks and the like and, more particularly, to an apparatus for controlling the pressure in the storage tank.

It is an object of this invention to provide an apparatus for controlling the pressure in a storage tank or the like.

It is a further object of the instant invention to provide an apparatus for recovering stored product which has vaporized in the storage tank or the like.

It is a further object of the instant invention to provide an apparatus for separating and recovering vaporized product from a vaporous mixture of stored product and non-condensable gases.

These and other objects more apparent hereinafter are accomplished by the apparatus of the instant invention which has particular utility in controlling the pressure within a storage tank containing volatile liquid. Briefly stated, the apparatus comprises a condenser arrangement wherein volatilized stored product is contacted with a liquid of the type stored whereby at least a portion thereof is condensed and returned to the storage tank. When those vapors not condensed in the condenser arrangement exert a pressure greater than that desired in the storage tank, a pressure regulator vents at least a portion of these vapors to the atmosphere. In this manner the internal pressure of the storage tank is maintained below a predetermined value. The vapors passing through the pressure regulator may pass to the atmosphere through a stripper arrangement, wherein they are contacted with an extraction solvent to recover therefrom vaporized stored product not condensed in the condenser arrangement. The extraction solvent containing extracted stored product is employed in the pressure regulator.

The invention, both as to its organization and method of operation, taken with further objects and advantages thereof, will best be understood by reference to the following description taken in conjunction with the accompanying drawings, in which:

FIG. 1 is a schematic view of the apparatus of the instant invention which is shown attached to a stationary storage tank;

FIG. 2 is a cross-sectional view of the apparatus of the instant invention and a portion of the storage tank to which it is attached showing the apparatus during the pressure relief stage;

FIG. 3 is a fragmentary cross-sectional view of the instant apparatus as it appears when the pressure inside the tank is substantially atmospheric pressure; and FIG. 4 is a fragmentary cross-sectional view of the instant apparatus as it appears when the pressure inside the tank is greater than atmospheric pressure, but insufficient to cause pressure relief.

Referring now to the drawings, and more particularly to FIGS. 1 and 2, the pressure control apparatus, which is indicated generally by reference numeral 2, is shown operatively connected to a stationary storage tank 4 containing liquid anhydrous ammonia. The liquid boils at −28° F. at atmospheric pressure and characteristically has dissolved therein small quantities of non-condensable materials, such as nitrogen and hydrogen which condense below about −300° F. The storage tank 4 is provided with suitable refrigerating means, not shown, and is jacketed with suitable insulation 6, such as fiberglass, which is held in place by an aluminum jacket 8 or the like. A portion of the pressure control device 2 is likewise surrounded by insulation 6 for reasons more apparent hereinafter.

Since the temperature of the liquid ammonia in the tank 4 is far below the ambient temperature outside the tank, heat is continually transferred to the liquid ammonia. Such heat transfer causes vaporization of the liquid ammonia in the storage tank 4 and, in addition, the release of the dissolved non-condensable gases such as hydrogen and nitrogen. The vaporized ammonia and released non-condensable gases will collect in the upper part of the tank. Such ammonia vapors and uncondensed gas may create sufficiently high pressures within the storage tank 4 to cause it to rupture or otherwise become inoperative. Thus it is desirable to provide means for relieving the pressure within the storage tank 4 and, additionally, to recover the vaporized ammonia to prevent loss of the stored product.

The pressure control apparatus 2 comprises a housing 10 which communicates with the upper portion of the storage tank 4. The housing 10 is divided into two main sections, the condenser section 40 and the stripper section 42, which communicate with one another through a pressure regulator indicated generally by reference numeral 25. Vaporized ammonia and non-condensable gases released from the stored liquid pass upwardly into the condenser section 40 which comprises a plurality of perforated plates 12. During their upward passage through the plates 12, these vapors are contacted with descending sub-cooled liquid ammonia entering the condenser section 40 through a pipe 14. The sub-cooled liquid ammonia, which is ammonia drawn from tank 4 and transmitted by a pump 5 through a cooler 7 into the pipe 14, condenses the vaporized ammonia and is returned with the condensed ammonia to the storage tank 4. Non-condensable gases, such as hydrogen and nitrogen, in the vapor mixture will, of course, not be condensed by the sub-cooled ammonia. Thus the non-condensable gases released from the stored liquid ammonia, and any vaporized ammonia not condensed, will tend to accumulate in the condenser section 40 by the pressure control apparatus 2.

It will be understood that the perforated plates 12 in the condenser section 40 may be any type of tray commonly employed for gas-liquid contacting, such as bubble-cap trays or the like. Likewise, it will be understood that the sub-cooled liquid ammonia employed to contact the gases entering the condenser section 40 may be obtained from any suitable source, but the arrangement shown in FIG. 1 is generally preferred.

The pressure regulator 25, which is located between the condenser section 40 and the stripper section 42, permits in a controlled manner the vapors in the storage tank to be exhausted to the atmosphere when the pressure inside the tank 4 becomes excessive. The pressure regulator 25 comprises a liquid trap or reservoir 16 and three substantially vertical pipe-shaped legs 18, 20 and 22 which communicate with one another and the liquid trap 16. The legs 20 and 22 extend upwardly to communicate with the stripper section 42, while the leg 18 opens into the condenser section 40. For reasons more apparent hereinafter, leg 22 communicates with the liquid trap 16 at a lower level than legs 20 and 18 and communicates between its ends with a liquid withdrawal pipe 30. The trap 16 is filled with liquid ammonium hydroxide 32.

During normal operation, that is, when the pressure of the vapors inside the tank are at substantially atmospheric pressure, the liquid ammonium hydroxide 32 will fill the trap 16 and a portion of legs 18, 20 and 22, as shown in FIG. 3. The ammonium hydroxide will be at the same level in each of the legs, that level being the point at which the withdrawal pipe 30 communicates with leg 22. Therefore, during normal operation, the condenser 40 and stripper 42 will not communicate with one another. Any excess ammonium hydroxide present in the trap or reservoir 16 flows by gravity from the trap 16 via pipe 30, as is apparent from FIGS. 2–4.

When the pressure of the non-condensable gases and uncondensed ammonia in the condenser section 40 exceeds atmospheric pressure, the liquid ammonium hydroxide in the leg 18 is displaced downwardly, as shown in FIG. 4, and the displaced liquid discharged from the reservoir 16 through outlet 30. The liquid level in legs 22 and 20 will tend to be substantially the same even as the pressure inside the storage tank increases above atmospheric pressure, as shown in FIG. 4.

When the pressure inside the tank becomes sufficiently great that all the liquid ammonium hydroxide has been displaced from the leg 18, as shown in FIG. 2, the gas will flow upwardly through the liquid in the leg 20. This route of travel by the vapors is occasioned by their seeking the path of least resistance. The liquid head in the leg 20 that the gas must overcome is less than the liquid head in the leg 22 by the distance $a$ between the bottom level of the leg 22 and the bottom level of the leg 20, since the liquid levels in legs 20 and 22 are substantially the same. The vapors therefore pass upwardly through the liquid in leg 20. When the pressure in the storage tank 4 becomes substantially greater than atmospheric pressure, the vapors will flow through leg 20 in such a large volume that all the liquid in this leg will be carried upwardly and out of leg 20 and be collected on a funnel-like plate 34 and returned to leg 22.

It will be noted, therefore, that the liquid head represented by the distance between the level of the bottom of leg 18 and the level of the pipe 30 is the head above atmospheric pressure which the vapors in the storage tank must overcome before they will pass through the pressure regulator 25 to the stripper section 42. This head may be varied for the particular pressure control desired by merely changing the level at which the withdrawal pipe 30 communicates with the leg 22.

The vapors passing through the pressure regulator 25 into the stripper section 42 are contacted therein with a downwardly extending stream of water entering through a pipe 26. Intimate contacting of the ascending vapors with the descending water is assisted by a plurality of perforated plates 28, which may be similar in all respects to the perforated plates 12 in the condenser section 40. The water extracts ammonia from these vapors to form ammonium hydroxide and descends downwardly onto the funnel-like member 34 wherein it is collected and drains into the leg 22. The non-condensable gases, which are not affected by contact with the water, are exhausted to the atmosphere through a flare 24.

A cap 38 suitably secured to the bottom of the lowest of the trays 28 is positioned above the outlet of leg 20 to prevent the ammonium hydroxide solution from entering leg 20. In this manner all liquid coming from the stripper section will fall on the funnel-like member 34, which separates the stripper and condenser sections, and drain into leg 22 and trap 16. Thus, there is a continual supply of ammonium hydroxide to the trap 16 to replace, during a period of decreasing pressure, any liquid which has been displaced from the pressure regulator 25. As little, if any, additional ammonium hydroxide is generally required by the regulator 25, most of the ammonium hydroxide entering the trap 16 will be removed therefrom through the overflow pipe 30.

If desired, means may be provided to terminate the flow of water into the stripper section 42 when gases are not entering the stripper section. For example, controls could be tied into the outlet 24 such that when there were no gases flowing through the outlet 24 the supply of water to the stripper section 42 by line 26 would be shut off.

The ammonium hydroxide recovered from the pipe 30 may be used directly to form ammonium salts, distilled to reclaim the ammonium or discarded. Ammonium hydroxide is excellent for use in the trap 16 since it will not freeze at the temperature of sub-cooled liquid ammonia in the condenser section 40 immediately below the trap.

In the event that the refrigeration shut-off control for tank 4 fails and the stored liquid in the tank becomes excessively sub-cooled, whereby its vapor pressure drops substantially below atmospheric pressure, the liquid in the trap 16 will be sucked into the condenser section 40 of the pressure control means 2 thereby opening the tank to the atmosphere. In this manner such a vacuum condition within the storage tank 4 will be relieved.

It will further be understood that though the instant invention has been specifically described with respect to the storage of liquid ammonia, that the apparatus of the instant invention is applicable to the storage of any liquid which may vaporize when the storage conditions are not substantially uniform. For example, the instant invention would be applicable to the storage of petroleum products or the like. The selection of the particular liquid to be used in the condenser section, pressure regulator or stripper section would be dependent upon the liquid stored and would be within the skill of one normally skilled in the art after having been taught the concept of the instant invention.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. An apparatus for controlling the pressure in a storage tank or the like comprising a housing communicating with said storage tank, said housing having an opening communicating with the atmosphere, means for condensing within said housing vapors from said storage tank, and a pressure regulator within said housing between said condenser means and said opening in said housing communicating with the atmosphere, said pressure regulator being operable when the pressure in the storage tank reaches a predetermined value, means for condensing with a liquid, vapors passing through said pressure regulator, said liquid being collected by said pressure regulator.

2. An apparatus for controlling the pressure in a storage tank or the like comprising a housing, means forming a first and second zone in said housing, said first zone communicating with the storage tank and said second zone communicating with the atmosphere, means for condensing within said first zone vapors from said storage tank, a pressure regulator within said housing providing the sole means of communication between said first and second zones, means for condensing with a liquid in said second zone vapors passing through said pressure regulator, said liquid passing from said second zone into said pressure regulator.

3. An apparatus for controlling the pressure in a storage tank or the like comprising a housing communicating with said storage tank, said housing having a partition means therein to form a first and second zone within said housing, said first zone communiacting with the storage tank and said second zone communicating with the atmosphere, means for condensing within said first zone vapors from said storage tank, a pressure regulator within said housing and cooperating with said partition member, said pressure regulator providing communication between said first and second zones, said pressure regulator comprising means forming a reservoir to hold liquid and three substantially vertical, pipe-like legs extending into said reservoir and communicating with one another, said first leg communicating with said first zone, said second and third legs communicating with said second zone, means to withdraw liquid from said third leg communicating with said third leg between the point at which it communicates with the second zone and the point at which it communicates with the reservoir.

4. An apparatus for controlling the pressure in a storage tank or the like comprising a housing communicating with said storage tank, said housing having a partition means therein to form a first and second zone within said housing, said first zone communicating with the storage tank and said second zone communicating with the atmosphere, means for condensing within said first zone vapors from said storage tank, a pressure regulator within said housing and cooperating with said partition member, said pressure regulator providing communication between said first and second zones, said pressure regulator comprising means forming a reservoir to hold liquid and three substantially vertical, pipe-like legs extending into said reservoir and communicating with one another, said first leg communicating with said first zone, said second and third legs communicating with said second zone, means to withdraw liquid from said third leg communicating with said third leg between the point at which it communicates with said second zone and the point at which it communicates with the reservoir, said third leg extending downwardly into said reservoir more than said first and second legs.

5. An apparatus for controlling the pressure in a storage tank or the like comprising a housing communicating with said storage tank, said housing having a partition means therein to form a first and second zone within said housing, said first zone communicating with the storage tank and said second zone communicating with the atmosphere, means for condensing within said first zone vapors from said storage tank, said condensing means comprising a plurality of horizontally mounted perforated plates and means for supplying liquid to said first zone above said perforated plates, a pressure regulator within said housing and cooperating with said partition member, said pressure regulator providing communication between said first and second zones, said pressure regulator comprising means forming a reservoir to hold liquid and three substantially vertical, pipe-like legs extending into said reservoir and communicating with one another, said first leg communicating with said first zone, said second and third legs communicating with said second zone, means to withdraw liquid from said third leg communicating with said third leg between the point at which it communicates with said second zone and the point at which it communicates with said reservoir, said third leg extending downwardly into said reservoir more than said first and second legs.

6. An apparatus for controlling the pressure in a storage tank or the like comprising a housing communicating with said storage tank, said housing having a funnel-shaped partition means therein to form a first and second zone within said housing, said first zone communicating with the storage tank and said second zone communicating with the atmosphere, means for condensing within said first zone vapors from said storage tank, said condensing means comprising a plurality of horizontally mounted perforated plates and means for supplying liquid to said first zone above said perforated plates, a pressure regulator within said housing and cooperating with said partition member, said pressure regulator providing communication between said first and second zones, said pressure regulator comprising means forming a reservoir to hold liquid and three substantially vertical, pipe-like legs extending into said reservoir and communicating with one another, said first leg communicating with said first zone, said second and third legs communicating with said second zone, said third leg cooperating with said funnel-like partition member to receive liquid deposited thereon, means to withdraw liquid from said third leg communicating with said third leg between the point at which it communicates with said second zone and the point at which it communicates with said reservoir, said third leg extending downwardy into said reservoir more than said first and second legs, said second zone having means for stripping a vaporous component from vapors flowing therethrough.

7. An apparatus for controlling the pressure in a storage tank or the like comprising a housing communicating with said storage tank, said housing having a funnel-shaped partition means therein to form a first and second zone within said housing, said first zone communicating with the storage tank and said second zone communicating with the atmosphere, means for condensing within said first zone vapors from said storage tank, said condensing means comprising a plurality of horizontally mounted perforated plates and means for supplying liquid to said first zone above said perforated plates, a pressure regulator within said housing and cooperating with said partition member, said pressure regulator providing communication between said first and second zones, said pressure regulator comprising means forming a reservoir to hold liquid and three substantially vertical, pipe-like legs extending into said reservoir and communicating with one another, said first leg communicating with said first zone, said second and third legs communicating with said second zone, said third leg cooperating with said funnel-like partition member to receive liquid deposited thereon, means to withdraw liquid from said third leg communicating with said third leg between the point at which it communicates with said second zone and the point at which it communicates with said reservoir, said third leg extending downwardly into said reservoir more than said first and second legs, said second zone having means for stripping a vaporous component from vapors flowing therethrough, said stripping means comprising a plurality of horizontally disposed perforated plates positioned within said second zone and means for introducing an extractive solvent into said zone above said plates.

8. An apparatus for controlling the pressure in a storage tank or the like comprising a housing, said housing having partition means therein to form within said housing two zones, the first zone communicating with the storage tank and the second zone communicating with the atmosphere, means for condensing within said first zone vapors from said storage tank, and a pressure regulator within said housing providing the sole means of communication between said first and second zones, said pressure regulator being operable when the pressure in the storage tank reaches a predetermined value, said pressure regulator comprising means forming a reservoir for holding a liquid, a plurality of substantially vertical pipes extending into said reservoir and communicating with one another, the first of said pipes communicating with said first zone, the second of said pipes communicating with said second zone, the third of said pipes communicating with said second zone and having an outlet for withdrawing liquid therefrom between the point where it communicates with the reservoir and the point where it communicates with said second zone.

9. An apparatus for controlling the pressure in a storage tank or the like comprising a housing having a first and second zone, said first zone communicating with the storage tank and said second zone communicating with the atmosphere, means for condensing within said first zone vapors from said storage tank, a pressure regulator providing communication between said first and second zones, said pressure regulator comprising reservoir means to hold liquid and three pipe members extending into said reservoir means and communicating with one another, said first pipe member communicating with said first zone, said second and third pipe members communicating with said second zone, means to withdraw liquid from said third pipe member communicating with said third pipe member between the point at which it communicates with said second zone and the point at which it communicates with said reservoir means.

10. A pressure regulator for a storage tank or the like which comprises reservoir means to hold a liquid and means forming first, second and third passageways which extend into said reservoir means and communicate with one another, said first passageway communicating with said storage tank, said second and third passageways communicating with the atmosphere, and means to withdraw liquid from said third passageway communicating with said third passageway between the point at which it communicates with the atmosphere and the point at which it communicates with said reservoir means.

11. A pressure regulator for a storage tank or the like which comprises reservoir means to hold a liquid and three pipe members extending into said reservoir means and communicating with one another, said first pipe member communicating with said storage tank, said second and third pipe members communicating with the atmosphere, and means to withdraw liquid from said third pipe member communicating with said third pipe member between the point at which it communicates with the atmosphere and the point at which it communicates with said reservoir means.

12. The apparatus of claim 2 wherein said pressure regulator includes a reservoir means for receiving liquid from said second zone.

References Cited in the file of this patent

UNITED STATES PATENTS

| | | |
|---|---|---|
| 1,264,479 | Barth | Apr. 30, 1918 |
| 1,653,387 | Brown | Dec. 20, 1927 |
| 1,669,230 | Cunningham | May 8, 1928 |
| 1,982,474 | Mesinger et al. | Nov. 27, 1934 |
| 2,004,074 | Kiley | June 4, 1935 |
| 2,059,942 | Gibson | Nov. 3, 1936 |